(12) United States Patent
Mai

(10) Patent No.: US 11,448,195 B2
(45) Date of Patent: Sep. 20, 2022

(54) SENSOR ARRANGEMENT FOR A WIND TURBINE

(71) Applicant: FOS4X GMBH, Munich (DE)

(72) Inventor: Manuel Mai, Munich (DE)

(73) Assignee: FOS4X GMBH, Munich (DE)

(*) Notice: Subject to any disclaimer, the term of this patent is extended or adjusted under 35 U.S.C. 154(b) by 0 days.

(21) Appl. No.: 17/059,201

(22) PCT Filed: May 29, 2019

(86) PCT No.: PCT/EP2019/064067
§ 371 (c)(1),
(2) Date: Nov. 25, 2020

(87) PCT Pub. No.: WO2019/229172
PCT Pub. Date: Dec. 5, 2019

(65) Prior Publication Data
US 2021/0199094 A1 Jul. 1, 2021

(30) Foreign Application Priority Data
May 29, 2018 (DE) .................. 102018112825.8

(51) Int. Cl.
*F03D 17/00* (2016.01)
*F03D 80/40* (2016.01)
*F03D 7/04* (2006.01)

(52) U.S. Cl.
CPC ............. *F03D 17/00* (2016.05); *F03D 7/042* (2013.01); *F03D 80/40* (2016.05);
(Continued)

(58) Field of Classification Search
CPC .......... F03D 7/042; F03D 17/00; F03D 80/40; F05B 2270/301; F05B 2270/303; F05B 2270/334; F05B 2270/807; Y02E 10/72
See application file for complete search history.

(56) References Cited

U.S. PATENT DOCUMENTS 6,940,186 B2 * 9/2005 Weitkamp ............... F03D 7/042
290/44
7,317,260 B2 * 1/2008 Wilson .................. F03D 7/0236
290/44
(Continued)

FOREIGN PATENT DOCUMENTS

DE 10219664 A1 11/2003
DE 102012015456 A1 2/2014
(Continued)

OTHER PUBLICATIONS

International Search Report for Application No. PCT/EP2019/064067, dated Aug. 30, 2019.
(Continued)

*Primary Examiner* — Pedro J Cuevas
(74) *Attorney, Agent, or Firm* — Moser Taboada

(57) ABSTRACT

The invention relates to a sensor arrangement for use on a wind turbine. The sensor arrangement comprises a rotor blade-related sensor, which is arranged in/on a rotor blade, and a non-rotor blade-related sensor, wherein the sensor signals, which are associated with the rotor blade-related sensor, are processed by fusion with the sensor signals which are associated with the non-rotor blade-related sensor. The invention also relates to a method for operating a wind turbine.

15 Claims, 4 Drawing Sheets

(52) U.S. Cl.
CPC ... *F05B 2270/301* (2013.01); *F05B 2270/303* (2013.01); *F05B 2270/334* (2013.01); *F05B 2270/807* (2013.01); *Y02E 10/72* (2013.01)

(56) References Cited

U.S. PATENT DOCUMENTS

| | | | | |
|---|---|---|---|---|
| 7,851,934 B2* | 12/2010 | Nyborg | F03D 9/255 | 290/55 |
| 7,941,281 B2* | 5/2011 | Rai | G05B 23/0245 | 702/34 |
| 8,039,981 B2* | 10/2011 | Egedal | G01H 1/006 | 290/43 |
| 8,109,722 B2* | 2/2012 | Gamble | F03D 80/00 | 416/1 |
| 8,511,988 B2* | 8/2013 | Birkemose | F03D 7/0296 | 416/61 |
| 8,702,388 B2* | 4/2014 | Garate Lvaro | F03D 9/25 | 416/1 |
| 8,712,703 B2* | 4/2014 | Olesen | G01P 13/0066 | 702/34 |
| 8,733,164 B2* | 5/2014 | Olesen | G01P 13/045 | 73/170.06 |
| 8,784,059 B2* | 7/2014 | Zalusky | F03D 17/00 | 416/146 R |
| 8,847,419 B2* | 9/2014 | Bertolotti | F03D 7/043 | 290/44 |
| 9,018,788 B2* | 4/2015 | Bertolotti | F03D 17/00 | 290/55 |
| 9,062,653 B2* | 6/2015 | Brath | F03D 7/042 | |
| 9,217,413 B2* | 12/2015 | Olesen | G01P 5/26 | |
| 9,366,230 B2* | 6/2016 | Perley | F03D 7/042 | |
| 9,447,778 B2* | 9/2016 | Caponetti | F03D 7/042 | |
| 9,644,612 B2* | 5/2017 | Evans | F03D 7/048 | |
| 9,909,563 B2* | 3/2018 | Cook | F03D 7/0224 | |
| 10,107,259 B2* | 10/2018 | Kristoffersen | F03D 7/0224 | |
| 10,338,202 B2* | 7/2019 | Mashtare | G01S 7/4818 | |
| 10,344,740 B2* | 7/2019 | Caponetti | F03D 7/042 | |
| 10,422,321 B2* | 9/2019 | Muller | F03D 17/00 | |
| 10,487,804 B2* | 11/2019 | Evans | F03D 9/257 | |
| 10,605,228 B2* | 3/2020 | Evans | F03D 7/048 | |
| 10,641,244 B2* | 5/2020 | Nielsen | H02P 9/04 | |
| 10,655,601 B2* | 5/2020 | Muller | F03D 17/00 | |
| 10,815,972 B2* | 10/2020 | Evans | F03D 7/048 | |
| 10,927,819 B2* | 2/2021 | Elmose | F03D 7/0224 | |
| 10,982,653 B2* | 4/2021 | Nielsen | G05B 19/042 | |
| 11,002,248 B2* | 5/2021 | Hammerum | F03D 7/0224 | |
| 11,098,698 B2* | 8/2021 | Perley | F03D 17/00 | |
| 11,313,351 B2* | 4/2022 | Post | F03D 7/0204 | |
| 2004/0057828 A1 | 3/2004 | Bosche | | |
| 2009/0174186 A1* | 7/2009 | Nyborg | F03D 7/0224 | 290/44 |
| 2009/0317250 A1* | 12/2009 | Gamble | F03D 1/0658 | 416/1 |
| 2010/0161245 A1* | 6/2010 | Rai | G05B 23/0235 | 702/35 |
| 2010/0209243 A1* | 8/2010 | Birkemose | F03D 17/00 | 416/61 |
| 2011/0148110 A1* | 6/2011 | Egedal | G05B 23/0237 | 290/44 |
| 2011/0158806 A1* | 6/2011 | Arms | F03D 1/0658 | 416/31 |
| 2012/0133135 A1* | 5/2012 | Su | F03D 7/0264 | 290/44 |
| 2012/0173172 A1* | 7/2012 | Laurberg | G01H 1/006 | 702/56 |
| 2012/0211986 A1* | 8/2012 | Bertolotti | F03D 7/042 | 290/44 |
| 2013/0015662 A1* | 1/2013 | Bertolotti | F03D 7/043 | 290/44 |
| 2013/0110414 A1* | 5/2013 | Caponetti | G05B 15/02 | 702/35 |
| 2013/0183151 A1* | 7/2013 | Garate Lvaro | F03D 17/00 | 416/1 |
| 2013/0214535 A1* | 8/2013 | Brath | F03D 7/042 | 290/44 |
| 2013/0287567 A1 | 10/2013 | Olesen et al. | | |
| 2014/0125058 A1* | 5/2014 | Olesen | F03D 7/0204 | 290/44 |
| 2014/0271181 A1* | 9/2014 | Perley | F03D 7/04 | 416/61 |
| 2014/0377064 A1* | 12/2014 | Kristoffersen | F03D 7/0224 | 416/1 |
| 2016/0084224 A1* | 3/2016 | Tyber | F03D 9/257 | 700/287 |
| 2016/0084233 A1* | 3/2016 | Evans | H02J 3/00 | 73/112.01 |
| 2016/0146189 A1* | 5/2016 | Cook | F03D 7/0288 | 416/1 |
| 2016/0265513 A1* | 9/2016 | Evans | F03D 7/048 | |
| 2017/0009739 A1* | 1/2017 | Caponetti | F03D 17/00 | |
| 2017/0219697 A1* | 8/2017 | Mashtare | G01S 17/58 | |
| 2017/0268486 A1* | 9/2017 | Muller | F03D 7/042 | |
| 2017/0292501 A1* | 10/2017 | Perley | F03D 17/00 | |
| 2017/0328348 A1* | 11/2017 | Wilson | F03D 7/028 | |
| 2017/0335828 A1* | 11/2017 | Muller | F03D 80/40 | |
| 2017/0370348 A1* | 12/2017 | Wilson | F03D 7/024 | |
| 2018/0266391 A1* | 9/2018 | Danielsen | F03D 7/0284 | |
| 2019/0072071 A1* | 3/2019 | Hammerum | F03D 7/047 | |
| 2019/0170119 A1* | 6/2019 | Nielsen | H02P 9/04 | |
| 2019/0211805 A1* | 7/2019 | Elmose | G01M 13/045 | |
| 2020/0018291 A1* | 1/2020 | Rosen | F03D 17/00 | |
| 2020/0056589 A1* | 2/2020 | Evans | F03D 7/045 | |
| 2020/0132052 A1* | 4/2020 | Schmid | G01H 9/004 | |
| 2020/0224640 A1* | 7/2020 | Schmid | G01B 11/16 | |
| 2020/0226480 A1* | 7/2020 | Johnston | H04N 7/188 | |
| 2020/0263667 A1* | 8/2020 | Nielsen | G05B 19/042 | |
| 2020/0300227 A1* | 9/2020 | Evans | F03D 7/048 | |
| 2021/0190041 A1* | 6/2021 | Duarte Pereira | F03D 17/00 | |
| 2021/0207583 A1* | 7/2021 | Dalsgaard | F03D 17/00 | |
| 2021/0239100 A1* | 8/2021 | Hawkins | G05B 23/0262 | |
| 2021/0246875 A1* | 8/2021 | Fu | F03D 7/042 | |
| 2021/0364392 A1* | 11/2021 | Huang | F03D 7/048 | |
| 2022/0010769 A1* | 1/2022 | Post | F03D 7/0204 | |

FOREIGN PATENT DOCUMENTS

| | | |
|---|---|---|
| DE | 102014223662 A1 | 5/2016 |
| EP | 2565444 A1 | 3/2013 |
| EP | 2932094 A1 | 10/2015 |
| WO | WO-2014/090903 A1 | 6/2014 |

OTHER PUBLICATIONS

German Office Action for application No. DE 102018112825.8 dated Sep. 30, 2021.

* cited by examiner

SENSOR ARRANGEMENT FOR A WIND TURBINE

TECHNICAL FIELD

The present invention relates to a sensor arrangement for use on a wind turbine, a wind turbine and a method for operating a wind turbine.

STATE OF THE ART

Wind power is considered to be one of the cleanest and most environmentally friendly energy sources that are currently available. In this respect, wind turbines have gained increasing attention. A wind turbine usually has a tower, at the tip of which a nacelle having a rotor with a rotor hub with rotor blades is arranged, a generator and a gear housing. The rotor blades capture kinetic energy of wind and transmit it by rotational energy for rotating a shaft located within the nacelle and connecting the rotor blades to a gear or, if no gear is used, directly to a generator. The generator then converts the mechanical energy into electrical energy which can be fed into a supply network.

Wind turbines are controlled for a maximum yield from the wind power. If in this case maximum loads (in accordance with the design) of components are exceeded, damages might be the result. As a consequence, total failures might be the result. Since troubleshooting and the implementation of repairs lead to extremely high costs, in particular in offshore facilities, damage prevention and the rapid analysis of component defects and damages on wind turbines are of crucial importance.

The condition of a rotor blade, for example, wear, material fatigue and other changes which might occur due to ageing or utilization, is the object of condition monitoring of wind turbines. By knowing the condition, maintenance works can be scheduled, the current value of the installation can be estimated, and legislator's and clients' safety requirements can be met.

In monitoring operational states of wind turbines, a plurality of sensors is used. For example, elongation measurements for measuring the deflection of a rotor blade, acceleration measurements for measuring an acceleration of a rotor blade, or other variables can be measured.

From DE 10 2014 223 662 A1, a sensor arrangement for being arranged in a rotor blade of a wind turbine is known, in which sensor data detected within a rotor blade is fused. The sensor arrangement has a pressure sensor and a multi-axis magnetic field sensor. The pressure sensor provides a pressure signal which represents an internal pressure within the rotor blade. The multi-axis magnetic field sensor provides a magnetic field signal which represents a direction of the Earth's magnetic field from a perspective of the rotor blade. The sensor arrangement is provided with an evaluation electronics for sensor data fusion of sensors within the rotor blade.

The sensor arrangement mentioned above, for example, has the disadvantage that damages can only be recognized in an insufficient or delayed manner.

In general, it is desirable for improvements in monitoring the sensors of a wind turbine and/or the wind turbine itself to be enabled.

SUMMARY OF THE INVENTION

The invention is based on the task of proposing a sensor arrangement or a wind turbine or a method which enables an improved damage detection and damage analysis.

The task is solved by a sensor arrangement having the features of claim 1, a wind turbine having the features of claim 5, and a method having the features of claim 7, respectively.

According to one embodiment, a sensor arrangement for use on a wind turbine is provided. The sensor arrangement for use on a wind turbine comprises a rotor blade-related sensor, which is arranged in or on a rotor blade, and a non-rotor blade-related sensor. The sensor signals, which are associated with the rotor blade-related sensor, are processed by fusion with the sensor signals, which are associated with the non-rotor blade-related sensor.

According to a further embodiment, a wind turbine comprising a sensor arrangement is provided.

According to a further embodiment, a method for operating a wind turbine is provided. The method comprises detecting the sensor data from the sensor arrangement and processing the sensor data.

BRIEF DESCRIPTION OF THE DRAWINGS

Exemplary embodiments are illustrated in the drawings and explained in greater detail in the following description. Shown are in the drawings.

WAYS FOR EXECUTING THE INVENTION

Figure 1:
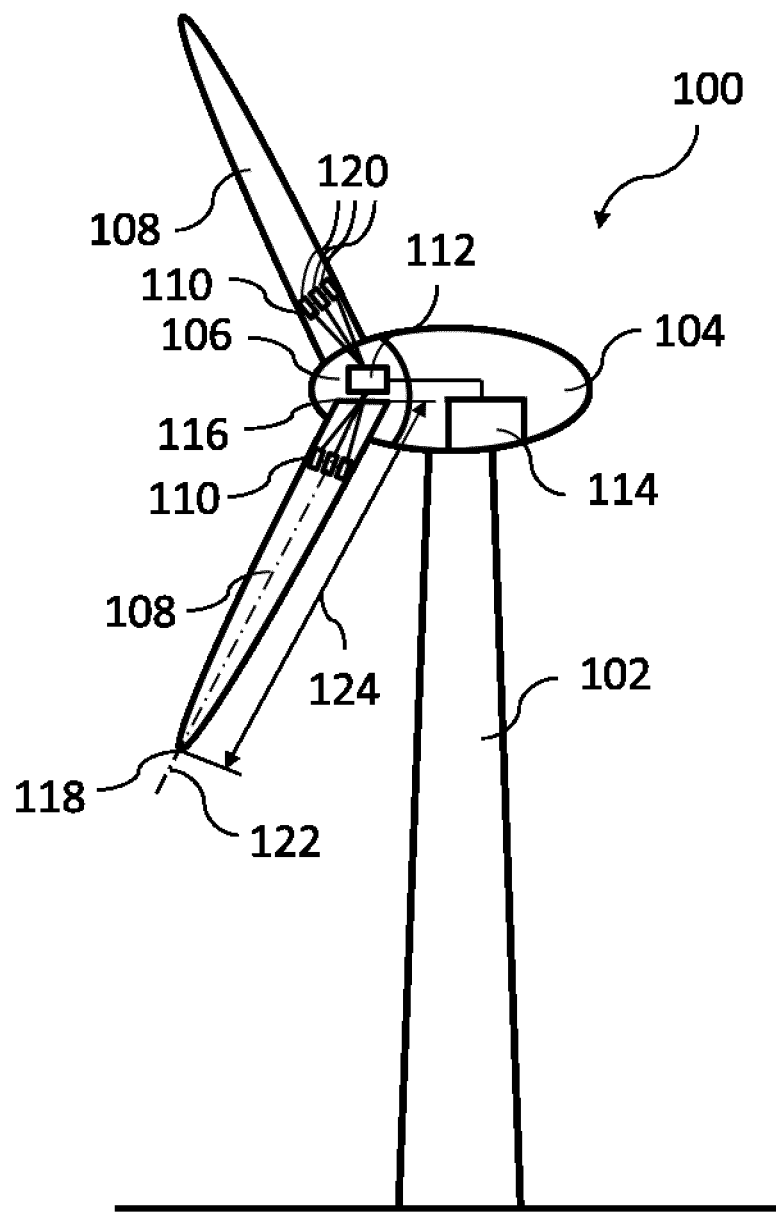
FIG. 1 a schematic representation of a wind turbine according to embodiments described herein.

In the following, detailed reference is made to various embodiments of the invention, with one or more examples being illustrated in the drawings.

Wind turbines can be monitored and controlled by sensors in or on the rotor blades (rotor blade-related sensors) and/or in other parts (non-rotor blade-related sensors), for example, in or on the rotor hub, in or on the tower, and in or on the nacelle. One or more of the following applications may be implemented by rotor blade-related sensors or variables may be measured: individual blade pitch of a rotor blade, buoyancy optimization of a rotor blade, load control of a rotor blade or of the wind turbine, load measurement on a rotor blade or on the wind turbine, condition determination of components of the wind turbine, for example, condition determination of a rotor blade, ice recognition, lifetime estimation of components of the wind turbine, for example, of a rotor blade, control based on wind fields, control based on overrun effects of the rotor, control of the wind turbine based on loads, control of the wind turbine with respect to adjacent wind turbines, predictive maintenance and imbalance recognition. By non-rotor blade-related sensors, for example, in the rotor hub, the gravitational force or centrifugal force acting upon the rotor blades can be derived.

Embodiments of the present invention relate to a sensor arrangement of a wind turbine including a combination of rotor blade-related sensors and non-rotor blade-related sensors. The invention furthermore relates to processing the sensor data by fusion. The fusion or the combination of rotor blade-based sensor data with non-rotor blade-based sensor data allows an improved monitoring of the wind turbine to be achieved. In addition, the fusion of the sensor data allows an improved image of the condition and the operation of the wind turbine to be gained.

Fusion or fusing, such as used herein, comprises processing the rotor blade-based sensor data, wherein disturbance variables, for example, due to the position of the rotor blade relative to gravitational force or due to a vibration of the entire rotor when the non-rotor blade-related sensor is used in the rotor hub, are taken into account. Furthermore, an event such as, for example, forces of nature (lightning, icing, storm, hail, flood, etc.), still air or bird strike, can be recognized. If the method recognizes an event either from an analysis or evaluation of the rotor blade-based sensor data or from an analysis or evaluation of the non-rotor blade-based sensor data, the sensor data of the rotor blade-based sensors can be processed by fusion or fused with the sensor data of the non-rotor blade-based sensor data. If the method recognizes a change in the wind turbine, such as, for example, the condition of blades or the condition of the power train, the non-rotor blade-related sensors can be used for classifying the event. Thereby, a damage analysis can be achieved, in which the size, the kind and/or the site of the disturbances can be better assessed.

FIG. 1 shows a wind turbine 100. The wind turbine 100 includes a tower 102 and a nacelle 104. The rotor is fixed to the nacelle 104. The rotor includes a rotor hub 106 to which the rotor blades 108 are fixed by a blade root 116. According to typical embodiments, the rotor has at least two rotor blades, in particular three rotor blades. The rotor blade 100 has a blade axis 122 along its longitudinal extension. The length 124 of the rotor blade ranges from the blade root 116 to the blade tip 118. When the wind turbine 100 is in operation, the rotor rotates, i.e. the rotor hub 106 along with the rotor blades 108 rotate about an axis. Thereby, a generator is driven for generating electric power. Furthermore, the wind turbine 100 comprises a plurality of sensors, which are configured for optically, electrically and/or magnetically generating the sensor signals. The sensors can detect rotor blade-related and non-rotor blade-related parameters, for example, pressure, temperature, acceleration, oscillation, vibration, elongation, etc. Rotor blade-related sensor data, such as used herein, does not necessarily mean that the data is generated within the rotor blade, which is the case, for example, in generator vibrations. For example, it is even possible to distinguish an ice accretion from a structural damage. As illustrated in FIG. 1, rotor blade-related sensors are provided in or on a rotor blade 108 or in or on a plurality of rotor blades. The rotor blade comprises a plurality of sensors 120 forming a sensor group 110. Non-rotor blade-related sensors are provided in or on one or more of the following structures: rotor hub, tower, nacelle. The sensors are connected to an evaluation unit 112 by a signal line or by signal lines. The evaluation unit delivers a signal to a controller 114 of the wind turbine.

According to some embodiments, which can be combined with other embodiments, the rotor blade-related sensors are fiber optic elongation sensors and fiber optic vibration sensors. For fiber optic sensors, an optical signal is transmitted to the evaluation unit 112 by means of a light guide, for example, an optical fiber. In a fiber optic sensor, the actual sensor element is provided typically within an optical fiber, for example, in the form of a fiber Bragg grating.

Figure 2:
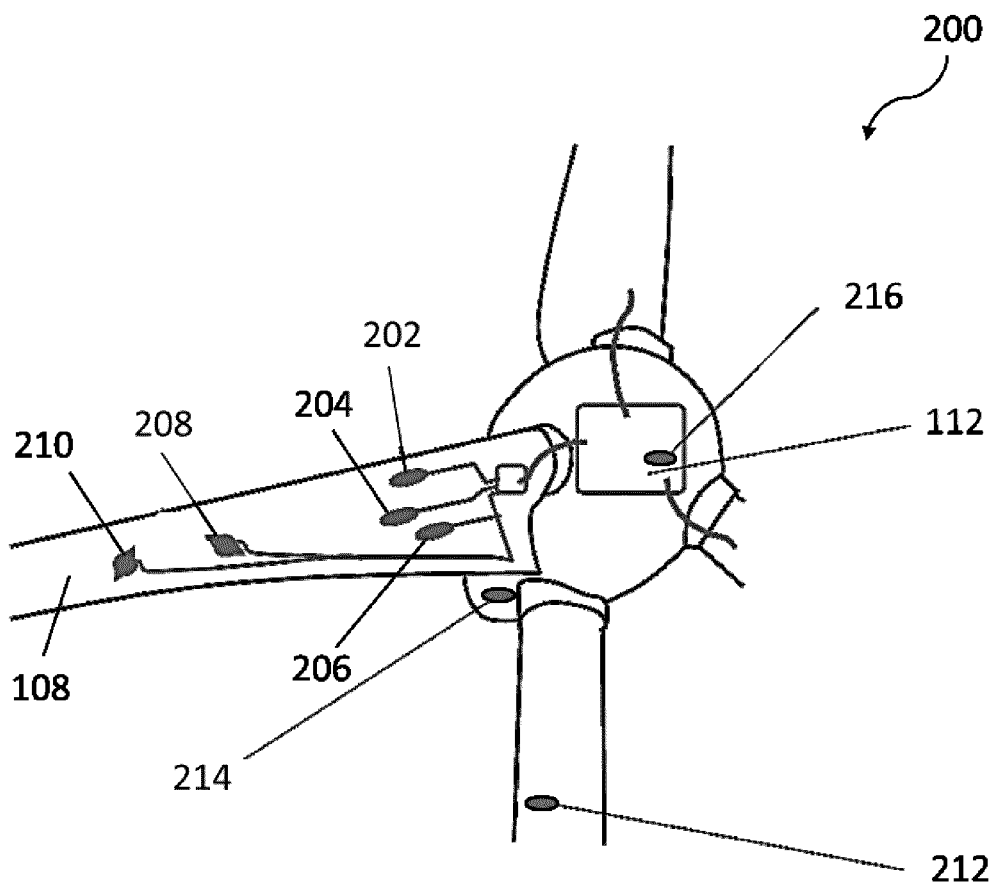
FIG. 2 a schematic representation of a part of a wind turbine having rotor-blade-related sensors and non-rotor blade-related sensors according to embodiments described herein.

FIG. 2 shows a part of a wind turbine 100, wherein portions of three rotor blades 108 are illustrated. An arrangement of a first elongation sensor 202, a second elongation sensor 204 and a third elongation sensor 206 is respectively provided in one rotor blade 108. Furthermore, according to embodiments described herein, a first vibration sensor 208 and a second vibration sensor 210 are provided. These numerical values are merely exemplary. Other suitable numbers, such as, for example, four elongation sensors or three vibrations sensors, may also be used. The signals of the sensors are provided to the evaluation unit 112, for example, via signal lines.

For determining the blade loads, the elongation sensors are utilized. They can be mounted in the blade root 116 of the rotor blade 108. The vibration sensors 208, 210 can be mounted at a position located approximately at half the length 124 of the rotor blade 108. According to some embodiments, the elongation sensors 202, 204, 206 can be mounted at an axial distance (i.e. along the blade axis 122) from the blade root 116 of about 5 m or less. According to further embodiments, which can be combined with other embodiments described herein, the vibration sensors 208, 210 can be mounted in a range of ±5 m in the axial direction (along the blade axis 122) from the center of the rotor blade 108. According to still further embodiments, the vibration sensors 208, 210 can be mounted in an area situated within a region extending from the center of the rotor blade 108 toward the blade tip 118.

The blade loads on a wind turbine can be deduced from the blade bending moments. The blade bending moment acting upon the rotor blade 108 can be calculated from the signals of the elongation sensors 202, 204, 206. For measurement technology, blade bending moments generally represent an indirect measurement variable. For blade load measurement, the blade loads are determined indirectly via measuring the blade elongations. The measured elongations represent in this case the indirect measurement variable. By calibrating the measurement system, the transfer function of the blade bending moments into the elongation signals may be assessed. Forming an inverse function subsequently allows the blade bending moments to be concluded from the measured elongation signals.

The quotient of the bending moment by the bending of the rotor blade is proportional to the stiffness of the rotor blade 108. The stiffness of the material of the rotor blade 108 may be considered as being the measure of the condition or the strength of the material of the rotor. In this case, the strength decreases when individual fibers in a composite fiber material break or the bonding of the fibers delaminates. Thus, an in situ measurement of the blade condition can be performed with the described arrangements or methods. In this case, the in situ measurement enables an improved recognition of ageing, material fatigue or similar states.

Through the use of three elongation sensors 202, 204, 206, redundancy and thus increased safety against failures is realized. Furthermore, according to embodiments described herein, it is possible for temperature-compensated elongation sensors, in particular temperature-compensated fiber optic elongation sensors to be used. By using temperature-compensated elongation sensors, the influence of temperature on the determination of the blade bending moments can be minimized. Fiber optic elongation sensors furthermore have a high peak and steady load resistance and enable a high reliability of the determination of blade bending moments.

According to embodiments described herein, a first vibration sensor 208 and a second vibration sensor 210 are situated in the axial area (along the blade axis 122). By means of vibration sensors within the rotor blade 108, vibrations of the rotor blade 108 can be determined and applications be realized, for example, for blade condition monitoring or ice detection. Alternatively, the vibration sensors 208, 210 may also be arranged on the rotor blade 108 without being integrated into it. The use of fiber optic sensors allows a reliable measurement of the blade vibration to be enabled without being affected by electromagnetic fields or high electrical currents, such as e.g. lightning strike. Fiber optic sensors can be provided without electrical components. Hereby, it can be avoided that lightning strikes directly into electronic components and/or cables or signal cables for electronic components.

The sensor group 110 (illustrated in FIG. 1) of the rotor blade-related sensors, which comprise a first elongation sensor 202, a second elongation sensor 204, a third elongation sensor 206, a first vibration sensor 208 and a second vibration sensor 210, each are provided in or on a rotor blade 108. The non-rotor blade-related sensors are provided in or on one or more parts of the wind turbine, such as, for example, the tower 212, the rotor hub 214, the nacelle 216. In embodiments, the non-rotor blade-related sensors are provided on parts of the wind turbine, which are different from the rotor blades 108. The signals of the rotor blade-related and non-rotor blade-related sensors are provided to the evaluation unit 112, for example, via signal lines. The evaluation unit delivers the sensor signals to a controller 114 (illustrated in FIG. 1) of the wind turbine.

The non-rotor blade-related sensors may be, for example, acceleration, acoustic emission, temperature and/or vibration sensors.

There is the possibility of retrofitting an existing wind turbine. Already installed sensors may be used in an existing wind turbine, for example, and only the evaluation unit will be retrofitted.

The combination or fusion of rotor blade-related sensors with non-rotor blade-related sensors allows a better monitoring of the wind turbine to be achieved. In addition, the fusion of the sensor data allows a better image of the condition and the operation of the wind turbine to be gained, whereby further applications might result.

Figure 3:
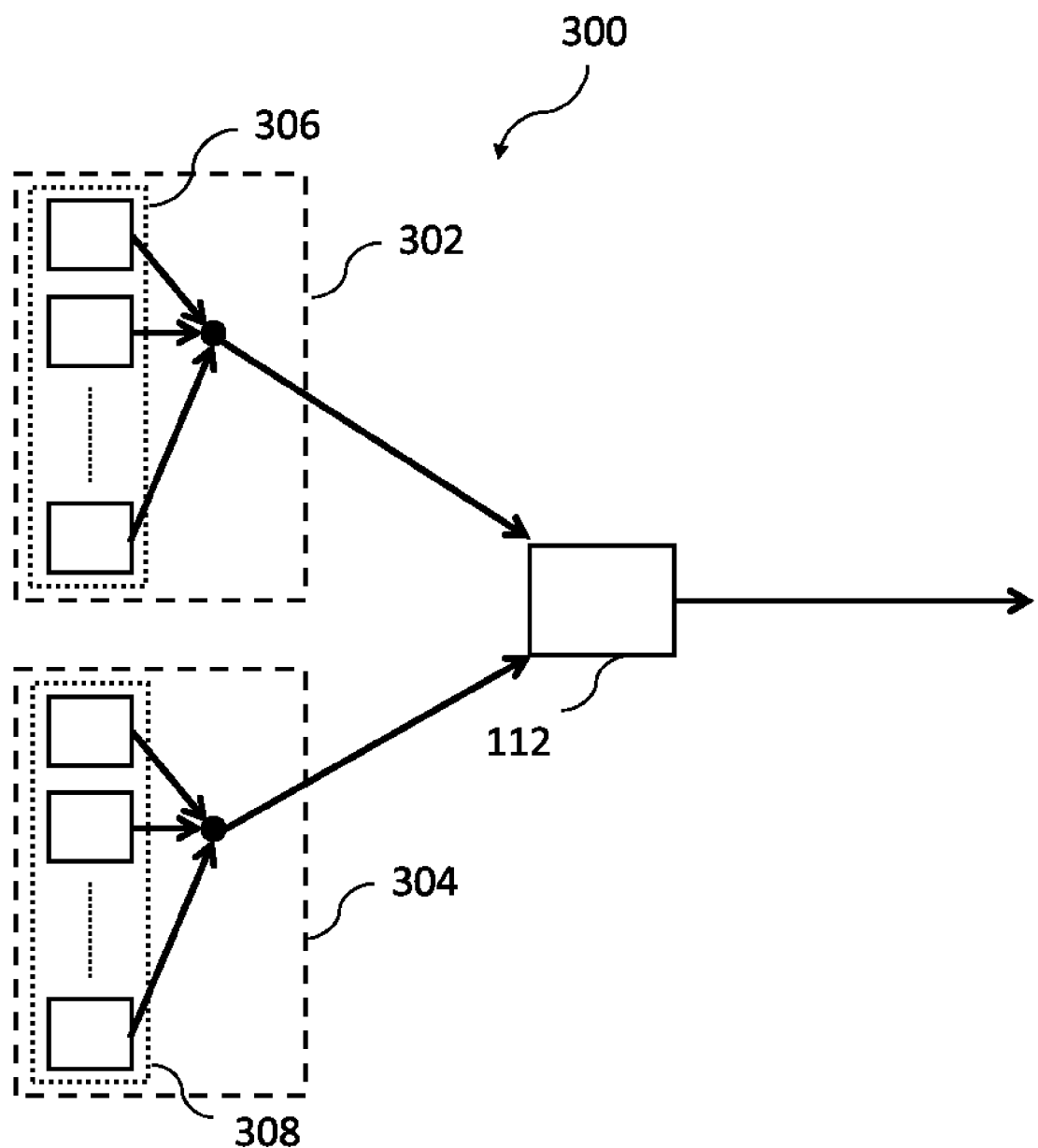
FIG. 3 a block diagram of a sensor arrangement according to further embodiments described herein.

FIG. 3 shows a block diagram 300 of a sensor arrangement 200 according to an exemplary embodiment of the present invention. The sensor arrangement 200 may in this case be employed in conjunction with the wind turbine 100 illustrated in FIG. 1. According to the present invention, the sensor arrangement 200 comprises rotor blade-related sensors 302 and non-rotor blade-related sensors 304. The rotor blade-related sensors 302 and the non-rotor blade-related sensors 304 are associated with the evaluation unit 112. The evaluation unit 112 is configured to process the sensor data by fusion. The rotor blade-related sensors 302 are arranged in a collective sensor group 306. The non-rotor blade-related sensors 304 are arranged in another collective sensor group 308.

According to some embodiments, the sensor group of the rotor blade-related sensors comprises elongation and vibration sensors. Monitoring a wind turbine comprises measuring vibrations by means of two vibration sensors in two different spatial directions (in a Cartesian coordinate system), and measuring elongations or blade bending moments in at least two, for example, three different spatial directions. Measuring vibrations may in particular include measuring frequency shifts of vibrations. Further in particular, measuring vibrations may be designed such that for the signals relevant for regulation or control and/or condition determination, a measurement of absolute accelerations and or measurement in frequency ranges are not performed. For regulation or control and/or condition determination of the wind turbine, only a frequency shift is detected based on the vibration sensors. According to embodiments described herein, the signals are used for monitoring or regulating, in particular for one of the applications mentioned above. Typically, elongation is measured in three spatial directions (in a Cartesian coordinate system) so that here, as well, an elongation having an arbitrary orientation in the plane of the blade root can be detected.

The non-rotor blade-related sensors 304, such as, for example acceleration sensors in the rotor hub, allow the gravitational force and the centripetal force acting upon the hub or the rotor blades to be detected.

According to some embodiments, which can be combined with other embodiments, the evaluation unit 112 has a signal converter, which generates a digital signal. The digital signal is then converted into an optical signal and is transmitted. The digitalized transmission directly after evaluating the signal has the advantage that the digital optical signal is less susceptible to falsification effects than, for example, an analog signal, in particular during the optical transmission and/or conversion. Thus, higher measurement accuracy can be achieved.

Figure 4:
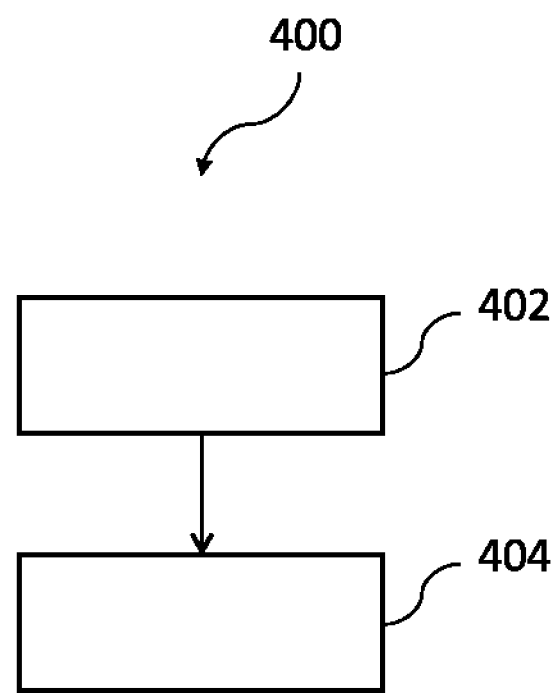
FIG. 4 a flow chart of a method for operating a wind turbine according to embodiments described herein.

FIG. 4 shows a flow chart of a method 400 for operating a wind turbine according to embodiments of the present invention. The method 400 can use the sensor arrangement 200 and the wind turbine 100 according to the embodiments described herein. In step 402, the method 400 comprises acquiring the sensor data detected by the sensor arrangement, and in step 404, processing the sensor data. In the step 404 of processing, the rotor blade-related sensor is calibrated. During the calibration of the measurement system (e.g. condition monitoring system or power train), disturbance variables due to the position of the rotor blade to gravitational force or due to a vibration of the entire rotor, can be taken into account when the non-rotor blade-related sensor is employed in the rotor hub. In the step 404 of processing, an event such as, for example, forces of nature (lightning strike, icing, storm, hail, flood, etc.), still air or bird strike, can be furthermore recognized. Also, a very weak event can be recognized, such as, for example, a front edge detachment (delamination at the front edge of the rotor blade). If the method recognizes an event either from an analysis or evaluation of the rotor blade-based sensor data or from an analysis or evaluation of the non-rotor blade-based sensor data, the sensor data of the rotor blade-based sensor can be processed or fused with the non-rotor-based sensors by fusion. Thus, the non-rotor blade-based sensor data can be utilized for validating the results from an analysis or evaluation of the rotor blade-based sensor data. If the method recognizes a change in the wind turbine, such as, for example, a change of the blade condition or of the power train condition, the non-rotor blade-related sensors can be used for classifying the event. If the method recognizes an event from an analysis or evaluation of the rotor blade-based sensor data, and the analysis or evaluation of the non-rotor blade-based sensor data does not recognize the event, the non-rotor blade-based sensor data can be utilized for validating the results from an analysis or evaluation of the rotor blade-based sensor data. Thereby, a damage analysis can be achieved, in which the size, the kind and/or the site of disturbances can be better assessed.

Fusion can be performed continuously, i.e. not only in certain cases. Alternatively, routine fusion can be performed, such as, for example, in certain intervals of time.

Further alternatively, fusion can be performed depending on the cause. Fusion can be performed, for example, depending on the operational state, such as, for example, rotor speed, temperature, ice positioning, pitch angle of the rotor blades, etc. An upper threshold value, which is suitable for the method, can be fixed. The upper threshold value, for example, is a defined upper threshold value for the rotor speed, during which, when it is exceeded, safe operation of the wind turbine is no longer admissible or no longer possible. Subsequently, fusion can neither be performed.

While the present invention had been described above using typical exemplary embodiments, it is not restricted to them but can be modified in a number of ways. The invention is neither restricted to the mentioned application possibilities.

The invention claimed is:

1. A sensor arrangement for use on a wind turbine comprising:
   a sensor group of rotor blade-related sensors which is arranged in or on a rotor blade and comprises elongation and vibration sensors; and
   at least one non-rotor blade-related sensor,
   wherein sensor signals associated with the rotor blade-related sensors are processed by fusion with sensor signals associated with the at least one non-rotor blade-related sensor, and
   wherein the fusion of the sensor signals associated with the rotor blade-related sensors and the sensor signals associated with the non-rotor blade-related sensors is performed depending on an operating state of the rotor blades.

2. The sensor arrangement according to claim 1, wherein the rotor blade-related sensors and/or the at least one non-rotor blade-related sensor are/is configured for optically, electrically and/or magnetically generating the sensor signals.

3. The sensor arrangement according to claim 1, wherein the rotor blade-related sensors and/or the at least one non-rotor blade-related sensor each provide/s a pressure signal, an acceleration signal, a temperature signal, a vibration signal, an elongation signal, an ice amount signal and/or a sound emission signal.

4. The sensor arrangement according to claim 1, wherein the at least one non-rotor blade-related sensor is arranged in or on one or more of the following structures of the wind turbine: rotor hub, tower, nacelle.

5. A wind turbine including a sensor arrangement according to claim 1.

6. The wind turbine according to claim 5, including a controller for acquiring and processing sensor data detected by the sensor arrangement.

7. A method for operating a wind turbine according to claim 5, the method comprising:
   acquiring sensor data detected by the sensor arrangement; and
   processing the sensor data.

8. The method according to claim 7, wherein processing includes calibrating the rotor blade-related sensors, wherein the at least one non-rotor blade-related sensor is taken into account in the calibrating.

9. The method according to claim 7, wherein processing an event includes recognizing lightning strike.

10. The method according to claim 7, wherein processing includes processing the sensor data of the rotor blade-related sensors by fusion with the sensor data of the at least one non-rotor blade-related sensor.

11. The method according to claim 7, wherein processing includes validating the sensor data of the rotor blade-related sensors with the sensor data of the at least one non-rotor blade-related sensor.

12. The method according to claim 7, wherein processing includes classifying.

13. The sensor arrangement according to claim 1, wherein the fusion of the sensor signals associated with the rotor blade-related sensors and the sensor signals associated with the non-rotor blade-related sensors is performed depending also on a threshold value of the operating state of the rotor blades.

14. The sensor arrangement according to claim 13, wherein the threshold value is an upper threshold value, which, when exceeded by the operating state of the rotor blades, fusion is not performed.

15. The sensor arrangement according to claim 14, wherein the upper threshold value is an upper threshold of rotor speed.

* * * * *